United States Patent
Hayashi

[11] Patent Number: 5,926,630
[45] Date of Patent: Jul. 20, 1999

[54] COMMUNICATION DEVICE INCLUDING A RECEIVING DATA PROCESSOR AND A BUS INTERFACE HAVING A DATA STORAGE AREA

[75] Inventor: Isamu Hayashi, Tokyo, Japan

[73] Assignee: Mitsubishi Denki Kabushiki Kaisha, Tokyo, Japan

[21] Appl. No.: 08/788,836

[22] Filed: Jan. 27, 1997

[30] Foreign Application Priority Data

Sep. 4, 1996 [JP] Japan .............................. 8-234126 (P)

[51] Int. Cl.⁶ .................................................. G06F 13/00
[52] U.S. Cl. ................ 395/309; 395/200.48; 395/200.8; 395/885
[58] Field of Search ......................... 395/200.43, 200.48, 395/200.8, 872, 877, 885, 876, 308, 309; 370/401, 402

[56] References Cited

U.S. PATENT DOCUMENTS

| | | | |
|---|---|---|---|
| 4,309,754 | 1/1982 | Dinwiddie, Jr. ........................ | 395/307 |
| 5,019,966 | 5/1991 | Saito et al. ............................... | 395/849 |
| 5,357,614 | 10/1994 | Pattisam et al. ........................ | 395/888 |
| 5,491,812 | 2/1996 | Pisello et al. ....................... | 395/200.66 |
| 5,615,382 | 3/1997 | Gavin et al. ............................ | 395/873 |
| 5,721,953 | 2/1998 | Fogg, Jr. et al. ....................... | 395/841 |

FOREIGN PATENT DOCUMENTS 6-332867  2/1994  Japan .

Primary Examiner—Gopal C. Ray
Attorney, Agent, or Firm—Burns, Doane, Swecker & Mathis, L.L.P.

[57] ABSTRACT

The object of the present invention is to obtain a communication device which improves latency and throughput in data transfer processing by reducing the number of accesses to a local bus. A bus interface 1a receives an user data from an AALLSI 4, and, when a host bus cannot be occupied, temporarily stores the user data in a data receiving buffer area 11. The capacity of the data receiving buffer area 11 in the bus interface 1a is set so as not to be full during normal data processing.

8 Claims, 5 Drawing Sheets

COMMUNICATION DEVICE INCLUDING A RECEIVING DATA PROCESSOR AND A BUS INTERFACE HAVING A DATA STORAGE AREA

BACKGROUND OF THE INVENTION

1. Field of the Invention

The present invention is related to a communication device for sending and receiving data.

2. Description of the Background Art

FIG. 10 is an explanatory diagram showing a data processing system with a conventional network interface card (hereinafter referred to as NIC). As shown in FIG. 10, an NIC 10 consists of a bus interface 1, a local memory 3 and an ATM adaptation layer LSI 4 (hereinafter referred to as AALLSI).

The AALLSI 4 receives data from outside and, after processing the data, writes the processed data into a data receiving buffer area 31 in the local memory 3 via a local bus 101. The bus interface 1 transfers the data, which is stored in the data receiving buffer area 31 in the local memory 3 via the local bus 101, to a host memory 2 via a host bus 100 by means of a DMA transfer.

In the above-mentioned NIC 10, when data is received, each data transfer between the local memory 3 and the AALLSI 4 or the bus interface 1, respectively, must be performed via the local bus 101. In short, access to the local bus 101 is required twice, which causes deterioration in latency and throughput in data transfer processing.

SUMMARY OF THE INVENTION

The present invention is directed to a communication device having a function to transfer data based on a received data obtained from outside to a host bus. According to a first aspect of the present invention, the communication device comprises a receiving data processing means for obtaining the received data from outside and converting the received data into an internal data processable inside, and a bus interface means for transferring the internal data to the host bus when occupying the host bus, wherein the bus interface means includes a data storage area in which the internal data is temporarily stored while the host bus cannot be occupied.

According to a second aspect of the present invention, in the communication device of the first aspect of the present invention, the capacity of the data storage area is set so as to have enough space to store the internal data received while the host bus cannot be occupied in normal operations on the basis of time required to occupy the host bus.

According to a third aspect of the present invention, in the communication device of the second aspect of the present invention, the capacity of the data storage area is set further on the basis of a difference between the quantity of a received data which is the quantity of the received data in per unit time, and the quantity of data transferred to a host bus which is the quantity of the internal data transferred to the host bus by the bus interface means in per unit time.

According to a fourth aspect of the present invention, the communication device of the third aspect of the present invention further comprises a local bus, and a local storage means including a local storage area which is connected to the local bus and in which the internal data may be stored, wherein the receiving data processing means temporarily stores the internal data in the local storage area via the local bus when the data storage area in the bus interface means leaves no space to store the internal data.

According to a fifth aspect of the present invention, in the communication device of the third aspect of the present invention, the receiving data processing means and the bus interface means are integrated with each other.

According to a sixth aspect of the present invention, in the communication device of the third aspect of the present invention, the data storage area includes a first partial data storage area and a second partial data storage area. Further, the bus interface means, when failing to occupy the host bus, stores the internal data in the first partial data storage area if the internal data requires relatively low real-time processing or in the second partial data storage area if the internal data requires relatively high real-time processing, and thereafter, when occupying the host bus, gives priority for transferring to the host bus to the internal data stored in the second partial data storage area over the internal data stored in the first partial data storage area.

According to a seventh aspect of the present invention, the communication device of the sixth aspect of the present invention further comprises a local bus, and a local storage means including a local storage area which is connected to the local bus and in which the internal data may be stored, wherein the receiving data processing means temporarily stores the internal data in the local storage area via the local bus when the first partial data storage area in the bus interface means leaves no space to store the internal data.

According to an eighth aspect of the present invention, in the communication device of the sixth aspect of the present invention, the receiving data processing means and the bus interface means are integrated with each other.

According to a ninth aspect of the present invention, in the communication device of the sixth aspect of the present invention, the bus interface means outputs an interruption request signal to occupy the host bus when receiving the internal data requiring relatively high real-time processing.

In the communication device of the first aspect of the present invention, the bus interface means temporarily stores the internal data in the data storage area while failing to occupy the host bus, so that it is possible to buffer the internal data received while the host bus cannot be occupied without any other storage devices.

In the communication device of the second aspect of the present invention, the capacity of the data storage area is set so as to have enough space to store the internal data, which is received while the host bus cannot be occupied in normal operations, on the basis of the time required to occupy the host bus. Thus, the internal data can be transferred to the host bus without abandonment in normal operations in the last result.

In the communication device of the third aspect of the present invention, the capacity of the data storage area is set further on the basis of a difference between the quantity of a received data which is the quantity of the received data in per unit time, and the quantity of data transferred to the host bus which is the quantity of the internal data transferred to the host bus by the bus interface means in per unit time. Thus, even if the quantity of the received data is greater than that of the data transferred to the host bus, the internal data can be transferred to the host bus without abandonment in the last result.

In the communication device of the fourth aspect of the present invention, the receiving data processing means temporarily stores the internal data in the local storage area via the local bus when the data storage area in the bus interface means has no space to store the internal data. Thus, even if the host bus cannot be occupied for a long time, the internal data can be transferred to the host bus without abandonment in the last result.

In the communication device of the fifth aspect of the present invention, the receiving data processing means and the bus interface means are integrated with each other, so that it is possible to transfer the internal data directly to the data storage area of the bus interface means and further to improve integration.

In the communication device of the sixth aspect of the present invention, while failing to occupy the host bus, the bus interface means stores the internal data requiring relatively low real-time processing in the first partial data storage area, and the internal data requiring relatively high real-time processing in the second partial data storage area, and thereafter, when occupying the host bus, the bus interface means gives priority for transferring to the host bus to the data stored in the second partial data storage area over the data stored in the first partial data storage area. Thus, the internal data requiring high real-time processing can be transferred to the host bus at a stage as early as possible.

In the communication device of the seventh aspect of the present invention, the receiving data processing means temporarily stores the internal data in the local storage area via the local bus when the first partial data storage area in the bus interface means has no space to store the internal data. Thus, even if the host bus cannot be obtained for a long time, the internal data requiring relatively low real-time processing can be transferred to the host bus without abandonment in the last result.

In the communication device of the eighth aspect of the present invention, the receiving data processing means and the bus interface means are integrated with each other, so that a direct data transfer between the receiving data processing means and the bus interface means is possible as well as improvement in integration.

In the communication device of the ninth aspect of the present invention, the bus interface means outputs the interruption request signal to occupy the host bus preferentially when receiving the internal data requiring high real-time processing. Thus, the bus interface means can preferentially transfer the internal data requiring high real-time processing to the host bus at a stage as early as possible.

An object of the present invention is to provide a communication device featuring improvement in latency and throughput in data transfer processing by reducing access to a local bus in number.

These and other objects, features, aspects and advantages of the present invention will become more apparent from the following detailed description of the present invention when taken in conjunction with the accompanying drawings.

DESCRIPTION OF THE PREFERRED EMBODIMENTS

FIRST PREFERRED EMBODIMENT

Figure 1:
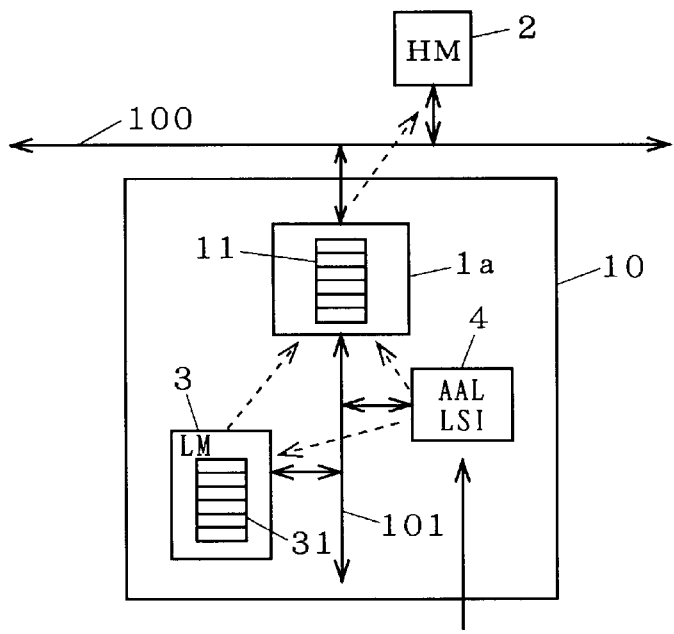
FIG. 1 is an explanatory diagram showing a structure of the communication device (NIC) according to the first preferred embodiment of the present invention.

FIG. 1 is an explanatory diagram showing a data processing system with an NIC of a first preferred embodiment of the present invention. As shown in FIG. 1, an NIC 10 consists of a bus interface 1a, a local memory 3 and an AALLSI 4.

The AALLSI 4 receives an ATM cell as a received data from outside to reassemble the cell to a user data. Then, the AALLSI 4 operates as a bus master to transfer the user data to a data receiving buffer area 11 in the bus interface 1a via a local bus 101 by means of a DMA transfer. If the data receiving buffer area 11 in the bus interface 1a is full at that time, the AALLSI 4 transfers the user data to a data receiving buffer area 31 in the local memory 3 via the local bus 101.

When failing to occupy the host bus 100 after receiving the user data, the bus interface 1a temporarily stores the user data in the data receiving buffer area 11. When occupying the host bus 100, the bus interface 1a transfers the user data to the host bus 100 to store the data at a prescribed address in a host memory 2. If there is any stored data in the data receiving buffer area 11 at that time, the data is transferred to the host bus 100 in order of storage.

The capacity of the data receiving buffer area 11 in the bus interface 1a is set so as not to be full during normal data processing. The following description gives details about the capacity of the data receiving buffer area 11.

In FIG. 1, if time required to occupy the host bus 100 is represented by Tac, the quantity of data received within the time Tac, represented by Daq, can be expressed as:

$$\mathrm{Daq} = (\text{the number of bits}) \times (\text{the number of data receiving clocks})$$
$$= B2 \times F2 \times Tac,$$

where F1 is an operating frequency of the host bus 100, B1 is a bus width, F2 is an operating frequency of a data path for the received data, and B2 is a data width.

If F1=33 MHz, B1=32 bits, F2=25 MHz, B2=32 bits, and Tac=2 μsec, for example, the quantity of data to be received is calculated as:

$$\mathrm{Daq} = 32 \times 25 \times 10^6 \times 2 \times 10^{-6} = 1600 \text{ (bits)}.$$

Thus, in order to transfer the user data, which is obtained by reassembling the received data in the AALLSI 4, via the bus interface 1a, the capacity of the data receiving buffer area 11 needs a minimum of 1600 bits.

Since {F1×B1>F2×B2} is satisfied in the above case, the user data may be transferred from the local bus 101 to the host bus 100 without abandonment after the host bus 100 is occupied.

On the other hand, if throughput of the data path for the received data (the quantity of the received data) is greater than that of the host bus 100 (the quantity of the data transferred to the host bus), i.e. if F1×B1>F2×B2, buffering is necessary even after the host bus 100 is occupied. While data is continuously received, part of the data is always abandoned irrespective of the capacity of the data receiving buffer area 11. The actual data is, however, received at a certain frequency, so that the quantity of the received data in per unit time, represented by Dtr, can be expressed as:

$$Dtr=F2\times B2\times P2;$$

where P2 is the frequency and less than 1.

In general, all of the data is supposed to be transferred to the host bus 100 when Dtr<F1×B1. However, the difference in throughput between the host bus 100 and the data path for the received data, calculated by (F2×B2−F1×B1), prevents part of the data from being transferred to the host bus 100. Thus, buffering of such data that would not be transferred is also necessary.

In this case, if a maximum time to continuously receive data is represented by Tmax, the capacity of buffer required to store the data which would not be transferred in part, represented by D1c, can be expressed as:

$$D1c=Tmax\times(F2\times B2-F1\times B1).$$

Thus, the data receiving buffer area 11 requires the capacity of (Daq+D1c) when throughput of the data path for the received data is greater than that of the host bus 100.

In this way, the capacity of the data receiving buffer area 11 in the bus interface 1a is determined by taking into account the capacity of buffer D1c, which is set by considering the case where part of the received data would not be transferred because the quantity of the received data is greater than that of the data transferred to the host bus, as well as the quantity of data Daq, which is set on the basis of the time Tac required to occupy the host bus 100. Therefore, even if the quantity of the received data is greater than that of the data transferred to the host bus in normal operations (or an average time to occupy the host bus 100), the data can be transferred from the AALLSI 4 to the bus interface 1a only with one transfer operation via the local bus 101.

In result, the NIC of the first preferred embodiment improves latency and throughput in data transfer processing by having less access to the local bus 101 than conventional devices.

On the other hand, when the data receiving buffer area 11 unusually becomes full in operations under unusual conditions such as a long-time occupation of the host bus 100 by other master devices and the like, the AALLSI 4 stores the user data into the data receiving buffer area 31 in the local memory 3 via the local bus 101, thereby reducing abandonment of the user data. Further, the AALLSI 4 makes it possible to transfer the data stored in the data receiving buffer area 31 in the local memory 3 to the data receiving buffer area 11 in the bus interface 1a, while the bus interface 1a is transferring the data stored in the data receiving buffer area 11 to the host bus 100 as occupying the host bus 100.

SECOND PREFERRED EMBODIMENT

Figure 2:
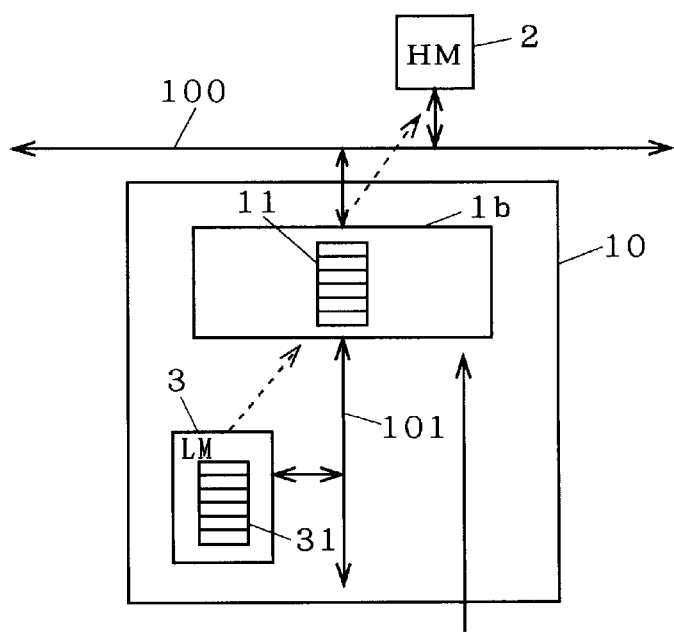
FIG. 2 is an explanatory diagram showing a structure of the communication device (NIC) according to the second preferred embodiment of the present invention.

FIG. 2 is an explanatory diagram showing a data processing system with an NIC of a second preferred embodiment of the present invention. As shown in FIG. 2, an NIC 10 consists of a bus interface 1b and a local memory 3.

The bus interface 1b has the function combined with the AALLSI 4 of the first preferred embodiment, receiving an ATM cell as a received data from outside and reassembling the cell to a user data to transfer the data at a prescribed address in a host memory 2 via a host bus 100 by means of a DMA transfer. The bus interface 1b includes a data receiving buffer area 11 in which the user data is temporarily stored while the host bus 100 cannot be occupied. When occupying the host bus 100, the bus interface 1b preferentially transfers the data stored in the data receiving buffer area 11 to the host bus 100 in order of storage.

Further, when the data receiving buffer area 11 in the bus interface 1b becomes full, the bus interface 1b transfers the user data to a data receiving buffer area 31 in the local memory 3 via a local bus 101.

The capacity of the data receiving buffer area 11 in the bus interface 1b, as is described in the first preferred embodiment, is set so as not to be full even if the quantity of the received data is greater than that of the data transferred to the host bus during normal data processing.

In this way, the NIC of the second preferred embodiment makes it possible to transfer the user data from the bus interface 1b directly to the host bus 100 without involvement of the local bus 101 in normal operations (or an average time to occupy the host bus 100) by setting the capacity of the data receiving buffer area 11 in the bus interface 1b so as not to be full during normal data processing.

In result, the NIC of the second preferred embodiment improves latency and throughput in data transfer processing by having less access to the local bus 101 than conventional devices.

On the other hand, when the data receiving buffer area 11 unusually becomes full in operations under unusual conditions such as a long-time occupation of the host bus 100 by other master devices and the like, the bus interface 1b stores the user data into a data receiving buffer area 31 in the local memory 3 via the local bus 101, thereby reducing abandonment of the user data. Further, the AALLSI 4 makes it possible to transfer the data stored in the data receiving buffer area 31 in the local memory 3 to the data receiving buffer area 11 in the bus interface 1b via the local bus 101, while the bus interface 1b is transferring the data stored in the data receiving buffer area 11 to the host memory 2.

Moreover, having the structure integrating the bus interface 1a with the AALLSI 4 both of the first preferred embodiment, the bus interface 1b in the NIC of the second preferred embodiment can transfer the user data directly to the data receiving buffer area 11 without involvement of the local bus 101 as well as improvement in integration.

THIRD PREFERRED EMBODIMENT

Figure 3:
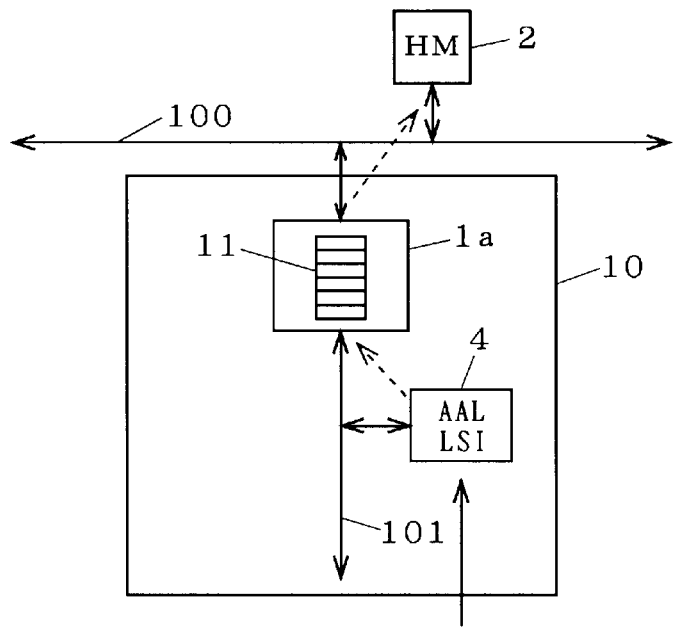
FIG. 3 is an explanatory diagram showing a structure of the communication device (NIC) according to the third preferred embodiment of the present invention.

FIG. 3 is an explanatory diagram showing a data processing system with an NIC of a third preferred embodiment of the present invention. As shown in FIG. 3, an NIC 10 consists of a bus interface 1a and an AALLSI 4.

The AALLSI 4 receives an ATM cell as a received data from outside and reassembles the cell to a user data. Then, the AALLSI 4 operates as a bus master to transfer the user data to a data receiving buffer area 11 in the bus interface 1a by means of a DMA transfer. If the data receiving buffer area 11 in the bus interface 1a becomes full at that time, the AALLSI 4 abandons the user data.

When failing to occupy a host bus 100 after receiving the user data, the bus interface 1a stores the user data in the data receiving buffer area 11. On the other hand, when occupying the host bus 100, the bus interface 1a transfers the user data to the host bus 100. If there is any stored data in the data receiving buffer area 11 at that time, the data is preferentially transferred to the host bus 100 in order of storage.

The capacity of the data receiving buffer area 11 in the bus interface 1a, as is described in the first preferred embodiment, is set so as not to be full even if the quantity of the received data is greater than that of the data transferred to the host bus during normal data processing.

In this way, the NIC of the third preferred embodiment makes it possible to transfer the user data from the bus interface 1a directly to the host bus 100 without involvement of the local bus 101 in normal operations (or an average time to occupy the host bus 100) by setting the capacity of the data receiving buffer area 11 in the bus interface 1a so as not to be full during normal data processing.

In result, the NIC of the third preferred embodiment improves latency and throughput in data transfer processing by having less access to the local bus 101 than conventional devices. And besides, cost reduction can be accomplished through the omission of a local memory 3.

FOURTH PREFERRED EMBODIMENT

Figure 4:
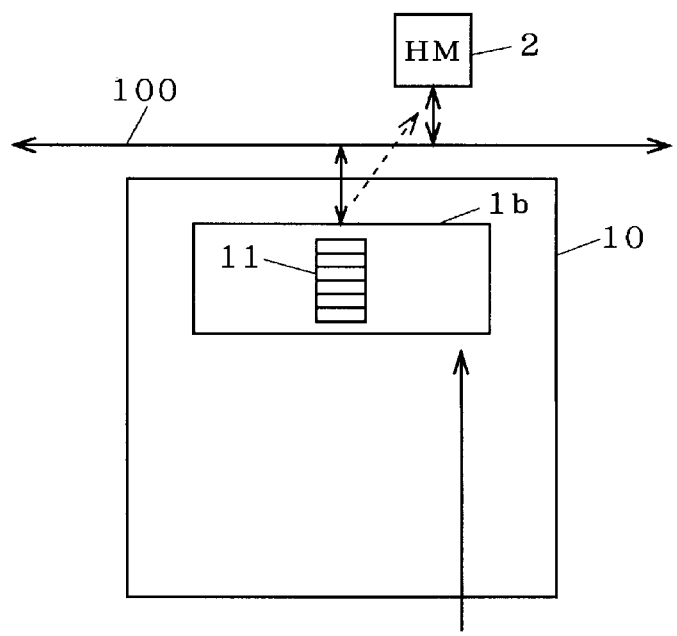
FIG. 4 is an explanatory diagram showing a structure of the communication device (NIC) according to the fourth preferred embodiment of the present invention.

FIG. 4 is an explanatory diagram showing a data processing system with an NIC of a fourth preferred embodiment of the present invention. As shown in FIG. 4, an NIC 10 includes a bus interface 1b.

As is the case with the second preferred embodiment, the bus interface 1b has the function combined with the AALLSI 4 of the first preferred embodiment, receiving an ATM cell as a received data from outside and reassembling the ATM cell to a user data to transfer the data at a prescribed address in a host memory 2 via a host bus 100 by means of a DMA transfer. The bus interface 1b includes a data receiving buffer area 11 in which the user data is stored while the host bus cannot be occupied. Then, when occupying the host bus 100, the bus interface 1b preferentially transfers the data stored in the data receiving buffer area 11 to the host bus 100 in order of storage.

Further, the bus interface 1b abandons the user data when the data receiving buffer area 11 in the bus interface 1b becomes full.

The capacity of the data receiving buffer area 11 in the bus interface 1b, as is described in the first embodiment, is set so as not to be full even if the quantity of the received data is greater than that of the data transferred to the host bus during normal data processing.

In this way, the NIC of the fourth preferred embodiment makes it possible to transfer data from the bus interface 1b directly to the host bus 100 in normal operations (or an average time to occupy the host bus 100) by setting the capacity of the data receiving buffer area 11 in the bus interface 1b so as not to be full during normal data processing.

In result, the NIC of the fourth preferred embodiment improves latency and throughput in data transfer processing without any access to a local bus.

Moreover, having the structure integrating the bus interface 1a with the AALLSI 4 both of the first preferred embodiment, the bus interface 1b in the NIC of the fourth preferred embodiment can accomplish a direct transfer of the user data to the data receiving buffer area 11 without involvement of a local bus 101 as well as improvement in integration. Further, cost reduction can also be achieved through the omission of a local memory 3.

FIFTH PREFERRED EMBODIMENT

Figure 5:
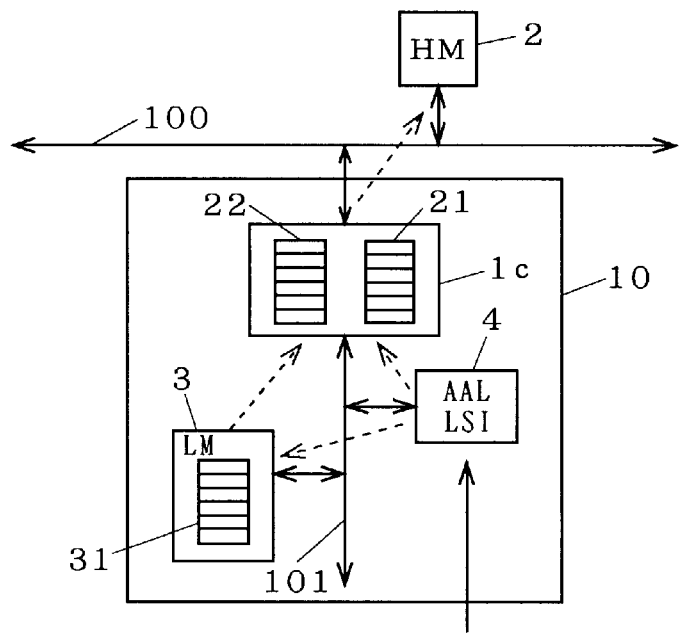
FIG. 5 is an explanatory diagram showing a structure of the communication device (NIC) according to the fifth preferred embodiment of the present invention.

FIG. 5 is an explanatory diagram showing a data processing system with an NIC of a fifth preferred embodiment of the present invention. As shown in FIG. 5, an NIC 10 consists of a bus interface 1c, a local memory 3 and an AALLSI 4.

The AALLSI 4 receives an ATM cell as a received data from outside and reassembles the cell to a user data. Then, the AALLSI 4 operates as a bus master to transfer the user data to either of a first buffer 21 or a second buffer 22 in the bus interface 1c by means of a DMA transfer. More specifically, the AALLSI 4 discriminates between a first type of data, which requires high accuracy and relatively low real-time processing such as a computer data and the like, and a second type of data, which requires relatively high real-time processing such as a voice data and the like. The first type of data is transferred to the first buffer 21, while the second type of data is transferred to the second buffer 22.

When occupying the host bus 100, the bus interface 1c gives priority for transferring to the host bus 100 to the second type of data, which is stored in the second buffer 22 and requires high real-time processing, over the first type of data stored in the first buffer 21.

When the first buffer 21 in the bus interface 1c becomes full, the AALLSI 4 transfers the user data to a data receiving buffer area 31 in the local memory 3 via a local bus 101. When the second buffer 22 becomes full, the AALLSI 4 abandons the received data.

Each capacity of the first and the second buffers 21, 22, in the same way as the data receiving buffer area 11 of the first preferred embodiment, is set so as not to be full during normal data processing.

In this way, the NIC of the fifth preferred embodiment makes it possible to transfer the user data from the bus interface 1c directly to the host bus 100 in normal operations (or an average time to occupy the host bus 100) without involvement of the local bus 101 by setting each capacity of the first and the second buffers 21, 22 so as not to be full during normal data processing.

In result, the NIC of the fifth preferred embodiment improves latency and throughput in data transfer processing by having less access to the local bus 101 than conventional devices.

Moreover, when obtaining the host bus 100 with data stored both in the first and the second buffers 21, 22, the bus interface 1c in the NIC of the fifth preferred embodiment gives priority for transferring to the host bus 100 to the second type of data which is stored in the second buffer 22 and requires high real-time processing, so that the data requiring high-real time processing can be transferred to the host bus 100 with a minimum of waiting time.

On the other hand, the first buffer 21 unusually becomes full in operations under unusual conditions such as a long-time occupation of the host bus 100 by other master devices, the AALLSI 4 stores the data into the data receiving buffer area 31 in the local memory 3 via the local bus 101, thereby reducing abandonment of the user data. Further, the AALLSI 4 abandons the user data when the second buffer 22 becomes full, since it is unnecessary to transfer the second type of data requiring high real-time processing after long delay.

In result, determining whether or not to transfer the user data to the data receiving buffer area 31 in the local memory 3 according to the types of the user data, the AALLSI 4 can make effective use of the local memory 3. Further, the AALLSI 4 makes it possible to transfer the data stored in the data receiving buffer area 31 in the local memory 3 to the first buffer 21 in the bus interface 1c while the bus interface 1c is transferring the data stored in the buffers to the host memory 2.

SIXTH PREFERRED EMBODIMENT

Figure 6:
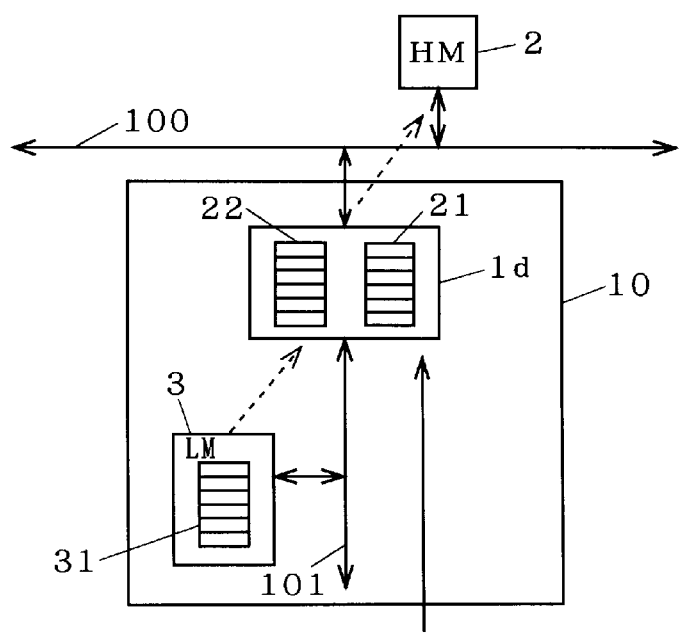
FIG. 6 is an explanatory diagram showing a structure of the communication device (NIC) according to the sixth preferred embodiment of the present invention.

FIG. 6 is an explanatory diagram showing a data processing system with an NIC of a sixth preferred embodiment of the present invention. As shown in FIG. 6, an NIC 10 consists of a bus interface 1d and a local memory 3.

The bus interface 1d has the function combined with the AALLSI 4 of the fifth preferred embodiment, receiving an ATM cell as a received data from outside and reassembling the ATM cell to a user data to transfer the data to a host memory 2 via a host bus 100 by means of a DMA transfer. The bus interface 1d includes a first and a second buffers 21, 22 in either of which the user data is stored when the host bus 100 cannot be occupied. More specifically, the bus interface 1d, in the same way as the bus interface 1c of the fifth preferred embodiment, stores a first type of data requiring high accuracy and relatively low real-time processing such as a computer data and the like in the first buffer 21, and a second type of data requiring relatively high real-time processing such as a voice data and the like in the second buffer 22.

When occupying the host bus 100, the bus interface 1c gives priority for transferring to the host bus 100 to the second type of data, which is stored in the second buffer 22 and requires high real-time processing, over the first type of data stored in the first buffer 21.

When the first buffer 21 in the bus interface 1d becomes full, the bus interface 1d transfers the user data to a data receiving buffer area 31 in the local memory 3 via a local bus 101. When the second buffer 22 becomes full, the bus interface 1d abandons the received data.

Each capacity of the first and the second buffers 21, 22 in the bus interface 1d, as is described in the fifth preferred embodiment, is set so as not to be full during normal data processing.

In this way, the NIC of the sixth preferred embodiment makes it possible to transfer the data from the bus interface 1d directly to the host bus 100 without involvement of the local bus 101 in normal operations (or an average time to occupy the host bus 100) by setting each capacity of the first and the second buffers 21, 22 in the bus interface 1d so as not to be full during normal data processing.

In result, the NIC of the sixth preferred embodiment improves latency and throughput in data transfer processing by having less access to the local bus 101 than conventional devices.

Moreover, when occupying the host bus with data stored both in the first and the second buffers 21, 22, the bus interface 1d gives priority for transferring to the host bus 100 to the second type of data which is stored in the second buffer 22 and requires high real-time processing, so that the data requiring high real-time processing can be transferred to the host bus 100 with a minimum of waiting time.

On the other hand, when the first buffer 21 unusually becomes full in operations under unusual conditions such as a long-time occupation of the host bus 100 by other master devices and the like, the bus interface 1d stores the user data in the data receiving buffer area 31 in the local memory 3 via the local bus 101, thereby reducing abandonment of the user data. Further, the bus interface 1d abandons the user data when the second buffer 22 becomes full, since it is unnecessary to transfer the second type of data requiring high real-time processing after a long delay.

In result, determining whether or not to transfer the user data to the data receiving buffer area 31 in the local memory 3 according to the types of the user data, the bus interface 1d can make effective use of the local memory 3. Further, the bus interface 1d makes it possible to transfer the data stored in the data receiving buffer area 31 in the local memory 3 to the first buffer 21 in the bus interface 1d while the bus interface 1d is transferring the data stored in the buffers to the host memory 2.

Furthermore, having a structure integrating the bus interface 1c with the AALLSI 4 both of the fifth preferred embodiment, the bus interface 1d in the NIC of the sixth preferred embodiment can accomplish a direct transfer of the user data to the data receiving buffer area 11 without involvement of the local bus 101 as well as improvement in integration.

SEVENTH PREFERRED EMBODIMENT

Figure 7:
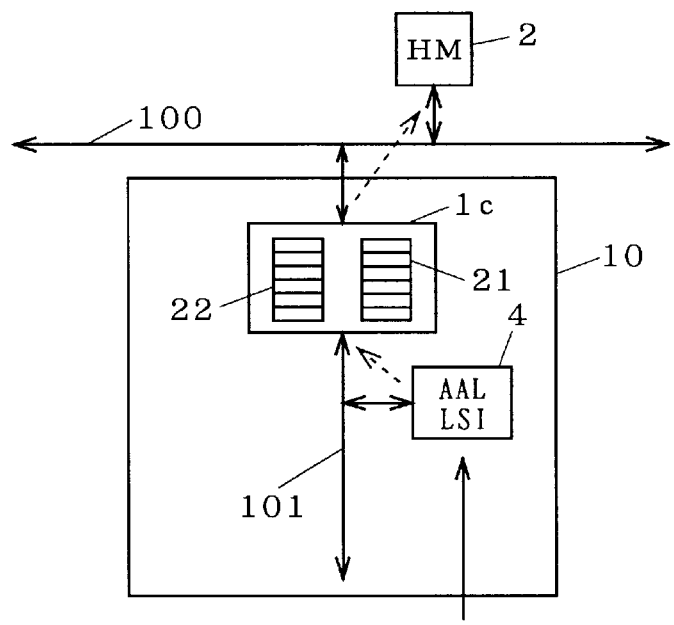
FIG. 7 is an explanatory diagram showing a structure of the communication device (NIC) according to the seventh preferred embodiment of the present invention.

FIG. 7 is an explanatory diagram showing a data processing system with an NIC of a seventh preferred embodiment of the present invention. As shown in FIG. 7, an NIC 10 consists of a bus interface 1c and an AALLSI 4.

The AALLSI 4 receives an ATM cell as a received data from outside and reassembles the cell to a user data. Then, the AALLSI 4 operates as a bus master to transfer the user data to either of a first or a second buffers 21, 22 in the bus interface 1c by means of a DMA transfer. More specifically, the AALLSI 4 transfers a first type of data requiring relatively low real-time processing to the first buffer 21, and a second type of data requiring relatively high real-time processing such as a voice data and the like to the second buffer 22.

When occupying the host bus 100, the bus interface 1c gives priority for transferring to the host bus 100 to the data stored in the second buffer 22 over the data stored in the first buffer 21.

The AALLSI 4 abandons the received data when either of the first or the second buffers 21, 22 in the bus interface 1c becomes full.

Each capacity of the first and the second buffers 21, 22 in the bus interface 1c, as is described in the fifth preferred embodiment, is set so as not to be full during normal data processing.

In this way, the NIC of the seventh preferred embodiment makes it possible to transfer data from the bus interface 1c directly to the host bus 100 without involvement of the local bus 101 in normal operations (or an average time to occupy the host bus 100) by setting each capacity of the first and the second buffers 21, 22 in the bus interface so as not to be full during normal data processing.

In result, the NIC of the seventh preferred embodiment improves latency and throughput in data transfer processing by having less access to the local bus 101 than conventional devices.

Moreover, when occupying the host bus 100 with data stored both in the first and the second buffers 21, 22, the bus interface 1c gives priority for transferring to the host bus 100 to the second type of data which is stored in the second buffer 22 and requires high-real time processing, so that the data requiring high real-time processing can be transferred to the host bus 100 with a minimum of waiting time. And besides, cost reduction can be accomplished through the omission of a local memory 3.

EIGHTH PREFERRED EMBODIMENT

Figure 8:
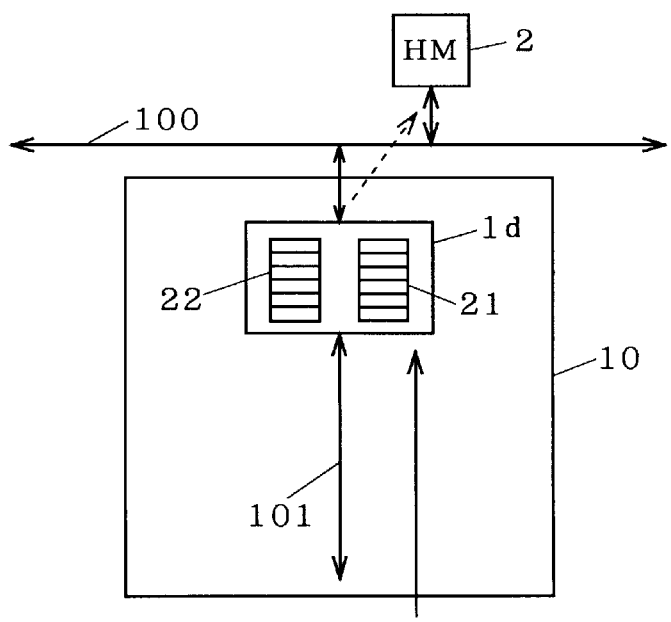
FIG. 8 is an explanatory diagram showing a structure of the communication device (NIC) according to the eighth preferred embodiment of the present invention.

FIG. 8 is an explanatory diagram showing a data processing system with an NIC of an eighth preferred embodiment of the present invention. As shown in FIG. 8, an NIC 10 includes a bus interface 1d.

The bus interface 1d has the function combined with the AALLSI 4 of the fifth preferred embodiment, receiving an ATM cell as a received data from outside and reassembling the cell to a user data to transfer the data to a host memory 2 via a host bus 100 by means of a DMA transfer. The bus interface 1d includes a first and a second buffers 21, 22 in either of which the user data is stored when the host bus 100 cannot be obtained. More specifically, in the same way as the bus interface 1c of the fifth preferred embodiment, the bus interface 1d stores a first type of data requiring relatively low real-time processing in the first buffer 21, and a second type of data requiring relatively high real-time processing in the second buffer 22. When occupying the host bus 100, the bus interface 1c gives priority for transferring to the host bus 100 to the second type of data stored in the second buffer 22 over the first type of data stored in the first buffer 21.

The bus interface 1d abandons the received data when either of the first or the second buffers 21, 22 in the bus interface 1d becomes full.

Each capacity of the first and the second buffers 21, 22 in the bus interface 1d, as is described in the first preferred embodiment, is set respectively so as not to be full during normal data processing.

In this way, the NIC of the eighth preferred embodiment makes it possible to transfer data from the bus interface 1d directly to the host bus 100 without involvement of a local bus in normal operations (or an average time to occupy the host bus 100) by setting each capacity of the first and the second buffers 21, 22 in the bus interface 1d respectively so as not to be full during normal data processing.

In result, the NIC of the eighth preferred embodiment improves latency and throughput in data transfer processing by having less access to the local bus 101 than conventional devices.

Moreover, when occupying the host bus 100 with data stored both in the first and the second buffers 21, 22, the bus interface 1d preferentially transfers the data, which is stored in the second buffer 22 and requires high-real time processing, to the host bus 100, so that the data requiring high real-time processing can be transferred with a minimum of waiting time.

Furthermore, having the structure combined the bus interface 1c with the AALLSI 4 both of the fifth preferred embodiment, the bus interface 1d in the NIC of the eighth preferred embodiment can accomplish a direct transfer of the user data to the data receiving buffer area 11 without involvement of the local bus 101 as well as improvement in integration. And besides, cost reduction can also be achieved through the omission of a local memory 3.

NINTH PREFERRED EMBODIMENT

Figure 9:
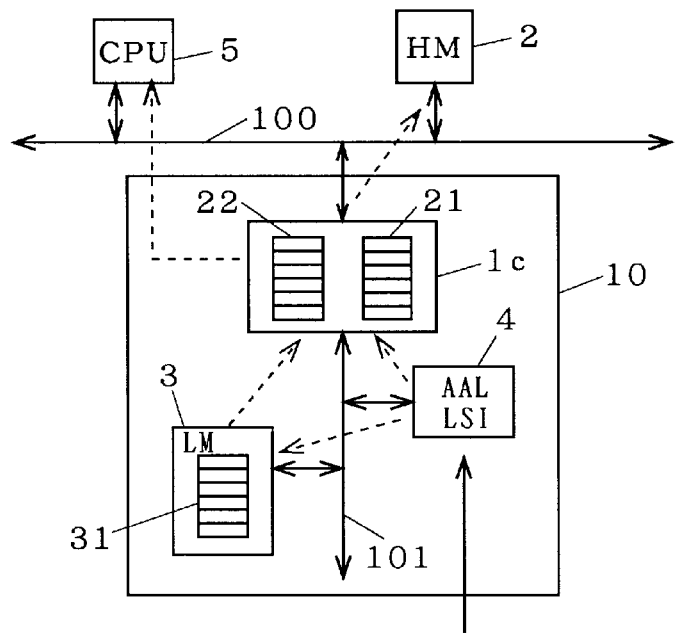
FIG. 9 is an explanatory diagram showing a structure of the communication device (NIC) according to the ninth preferred embodiment of the present invention.
Figure 10:
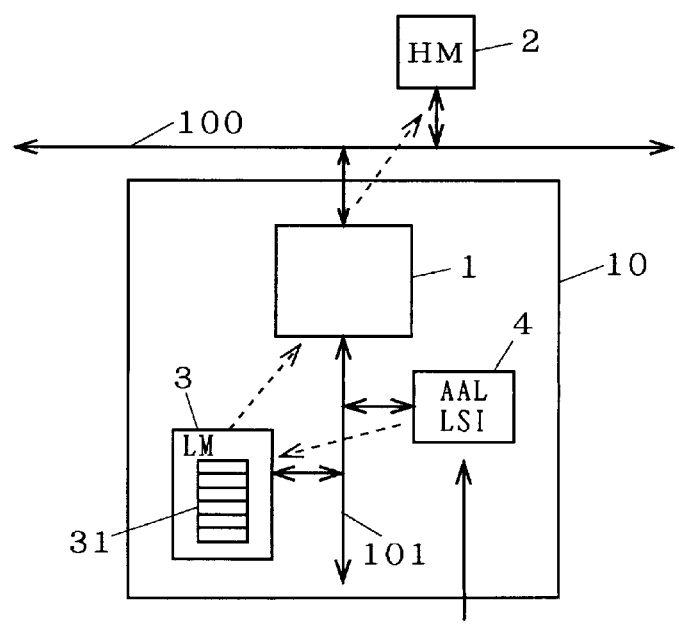
FIG. 10 is an explanatory diagram showing a structure of a conventional communication device (NIC).

FIG. 9 is an explanatory diagram showing a data processing system with an NIC of a ninth preferred embodiment. As shown in FIG. 9, an NIC 10 consists of a bus interface 1c, a local memory 3 and an AALLSI 4.

The AALLSI 4 receives an ATM cell as a received data from outside and reassembles the cell to a user data. Then, the AALLSI 4 operates as a bus master to transfer the user data to either of a first or a second buffers 21, 22 in the bus interface 1c by means of a DMA transfer. More specifically, the AALLSI 4 transfers a first type of data requiring relatively low real-time processing to the first buffer 21, and a second type of data requiring relatively high real-time processing such as a voice data and the like to the second buffer 22.

When storing the second type of data requiring high real-time processing in the second buffer 22, the bus interface 1c sends an interruption request signal for its exclusive use to a CPU 5, which is a host computer, as well as a normal bus request. If process in execution at that time is related to a data transfer of the NIC 10 (for example, transmission of the data), the CPU 5 receiving the interruption request suspends the process in execution and controls the data stored in the second buffer 22 to be preferentially received.

An explanation of the other structures and operations of the ninth preferred embodiment is omitted since the same is described in the fifth preferred embodiment shown in FIG. 5.

In this way, the NIC 10 of the ninth preferred embodiment can send an interruption request for its exclusive use to the CPU 5 when receiving the second type of data requiring high real-time processing, so that the data requiring relatively high real-time processing can be transferred to the host bus 100 with little waiting time.

Further, since the bus interface 1c of the ninth preferred embodiment adds the function to send an interruption request in order to receive the data requiring relatively high real-time processing to the bus interface 1c of the fifth preferred embodiment shown in FIG. 5, no doubt that the same function can be applied to the bus interface 1c of the seventh preferred embodiment and the bus interface 1d of either of the sixth or the eighth preferred embodiment.

While the invention has been described in detail, the foregoing description is in all aspects illustrative and not restrictive. It is understood that numerous other modifications and variations can be devised without departing from the scope of the invention.

I claim:

1. A communication device having a function to transfer data based on a received data obtained from outside to a host bus, comprising:

a receiving data processing means for obtaining said receiving data from outside and converting said received data into an internal data processable inside; and a bus interface means for transferring said internal data to said host bus when occupying said host bus, wherein said bus interface means includes a data storage area in which said internal data is temporarily stored while said host bus cannot be occupied, the capacity of said data storage area being set so as to have enough space to store said internal data received while said host bus cannot be occupied in normal operations on the basis of time required to occupy said host bus.

2. The communication device of claim 1, wherein said capacity of said data storage area is set further on the basis of a difference between the quantity of a received data which is the quantity of said received data in per unit time, and the quantity of data transferred to a host bus which is the quantity of said internal data transferred to said host bus by said bus interface means in per unit time.

3. The communication device of claim 2, further comprising, a local bus; and a local storage means having a local storage area which is connected to said local bus and in which said internal data may be stored;

wherein said receiving data processing means temporarily stores said internal data in said local storage area via said local bus when said data storage area in said bus interface means leaves no space to store said internal data.

4. The communication device of claim 2, wherein said receiving data processing means and said bus interface means are integrated with each other.

5. The communication device of claim 2, wherein said data storage area includes a first partial data storage area and a second partial data storage area; and said bus interface means, when failing to occupy said host bus, stores said internal data in said first partial data storage area if said internal data requires relatively low real-time processing or in said second partial data storage area if said internal data requires relatively high real-time processing, and thereafter, when occupying said host bus, gives priority for transferring to said host bus to said internal data stored in said second partial data storage area over said internal data stored in said first partial data storage area.

6. The communication device of claim 5, further comprising:

a local bus; and a local storage means including a local storage area which is connected to said local bus and in which said internal data may be stored;

wherein said receiving data processing means temporarily stores said internal data in said local storage area via said local bus when said first partial data storage area in said bus interface means leaves no space to store said internal data.

7. The communication device of claim 5, wherein said receiving data processing means and said bus interface means are integrated with each other.

8. The communication device of claim 5, wherein said bus interface means outputs an interruption request signal to occupy said host bus when receiving said internal data requiring relatively high real-time processing.

* * * * *